United States Patent
Despres et al.

(10) Patent No.: US 9,897,257 B2
(45) Date of Patent: Feb. 20, 2018

(54) ANTI-SPIKE PRESSURE MANAGEMENT OF PRESSURE-REGULATED FLUID STORAGE AND DELIVERY VESSELS

(71) Applicant: Entegris, Inc., Billerica, MA (US)

(72) Inventors: Joseph R. Despres, Middletown, CT (US); Joseph D. Sweeney, New Milford, CT (US); Edward E. Jones, Woodbury, CT (US); Matthew B. Donatucci, Bethel, CT (US); Chiranjeevi Pydi, Danbury, CT (US); Edward A. Sturm, New Milford, CT (US); Barry Lewis Chambers, Midlothian, VA (US); Gregory Scott Baumgart, New Fairfield, CT (US)

(73) Assignee: ENTEGRIS, INC., Billerica, MA (US)

( * ) Notice: Subject to any disclaimer, the term of this patent is extended or adjusted under 35 U.S.C. 154(b) by 75 days.

(21) Appl. No.: 14/430,105

(22) PCT Filed: Sep. 20, 2013

(86) PCT No.: PCT/US2013/061059
§ 371 (c)(1),
(2) Date: Mar. 20, 2015

(87) PCT Pub. No.: WO2014/047522
PCT Pub. Date: Mar. 27, 2014

(65) Prior Publication Data
US 2015/0247605 A1 Sep. 3, 2015

Related U.S. Application Data

(60) Provisional application No. 61/704,402, filed on Sep. 21, 2012.

(51) Int. Cl.
*F16K 31/12* (2006.01)
*F17C 13/12* (2006.01)
*F17C 13/04* (2006.01)

(52) U.S. Cl.
CPC ............. *F17C 13/12* (2013.01); *F17C 13/04* (2013.01); *F17C 2201/0104* (2013.01);
(Continued)

(58) Field of Classification Search
CPC .. F17C 13/12; F17C 13/04; F17C 2201/0104; F17C 2205/0326; F17C 2205/0329;
(Continued)

(56) References Cited

U.S. PATENT DOCUMENTS 4,077,422 A * 3/1978 Brinkley ................. F16K 17/30
137/68.14
5,303,734 A 4/1994 Eidsmore
(Continued)

FOREIGN PATENT DOCUMENTS

CN 1384315 A 12/2002
CN 202274285 U 6/2012
(Continued)

*Primary Examiner* — Jessica Cahill

(57) ABSTRACT

A fluid supply package comprising a pressure-regulated fluid storage and dispensing vessel, a valve head adapted for dispensing of fluid from the vessel, and an anti-pressure spike assembly adapted to combat pressure spiking in flow of fluid at inception of fluid dispensing.

16 Claims, 10 Drawing Sheets

(52) U.S. Cl.
CPC .................. *F17C 2205/035* (2013.01); *F17C 2205/0326* (2013.01); *F17C 2205/0329* (2013.01); *F17C 2205/0335* (2013.01); *F17C 2205/0338* (2013.01); *F17C 2205/0344* (2013.01); *F17C 2205/0382* (2013.01); *F17C 2205/0391* (2013.01); *F17C 2221/012* (2013.01); *F17C 2221/013* (2013.01); *F17C 2221/015* (2013.01); *F17C 2221/016* (2013.01); *F17C 2227/045* (2013.01); *F17C 2250/0626* (2013.01); *F17C 2270/0518* (2013.01); *Y02E 60/321* (2013.01); *Y10T 137/7795* (2015.04)

(58) Field of Classification Search
CPC ........ F17C 2205/035; F17C 2205/0335; F17C 2205/0338; F17C 2205/0391; F17C 2227/045; F17C 2250/0626; F17C 2270/0518; Y10T 137/7795
See application file for complete search history.

(56) References Cited

U.S. PATENT DOCUMENTS

| | | | |
|---|---|---|---|
| 5,937,895 A | 8/1999 | Le Febre et al. | |
| 6,007,609 A | 12/1999 | Semerdjian et al. | |
| 6,045,115 A | 4/2000 | Martin, Jr. et al. | |
| 6,089,027 A | 7/2000 | Wang et al. | |
| 6,101,816 A | 8/2000 | Wang et al. | |
| 6,343,476 B1 | 2/2002 | Wang et al. | |
| 6,360,546 B1* | 3/2002 | Wang | F17C 7/02 222/3 |
| 6,907,740 B2 | 6/2005 | Tom | |
| 6,910,602 B2* | 6/2005 | Hasaka | F17C 13/04 222/189.1 |
| 6,959,724 B2 | 11/2005 | Heiderman | |
| 7,708,028 B2 | 5/2010 | Brown et al. | |
| 7,905,247 B2 | 3/2011 | Campeau | |
| 2002/0014227 A1* | 2/2002 | Girouard | G05D 7/0106 123/527 |
| 2002/0050142 A1 | 5/2002 | Wang et al. | |
| 2003/0213521 A1* | 11/2003 | Downie | F17C 13/04 137/505.33 |
| 2009/0166359 A1* | 7/2009 | Pisot | F16K 1/306 220/203.29 |

FOREIGN PATENT DOCUMENTS

| | | |
|---|---|---|
| JP | 2004-046897 A | 2/2004 |
| JP | 2012-210631 A | 11/2012 |
| WO | 2004000338 A1 | 12/2003 |
| WO | 2004003426 A1 | 1/2004 |
| WO | 2007013715 A1 | 2/2007 |
| WO | 2008101257 A2 | 8/2008 |
| WO | 2009079218 A2 | 6/2009 |
| WO | 2010124722 A1 | 11/2010 |
| WO | 2014/047522 A1 | 3/2014 |

* cited by examiner

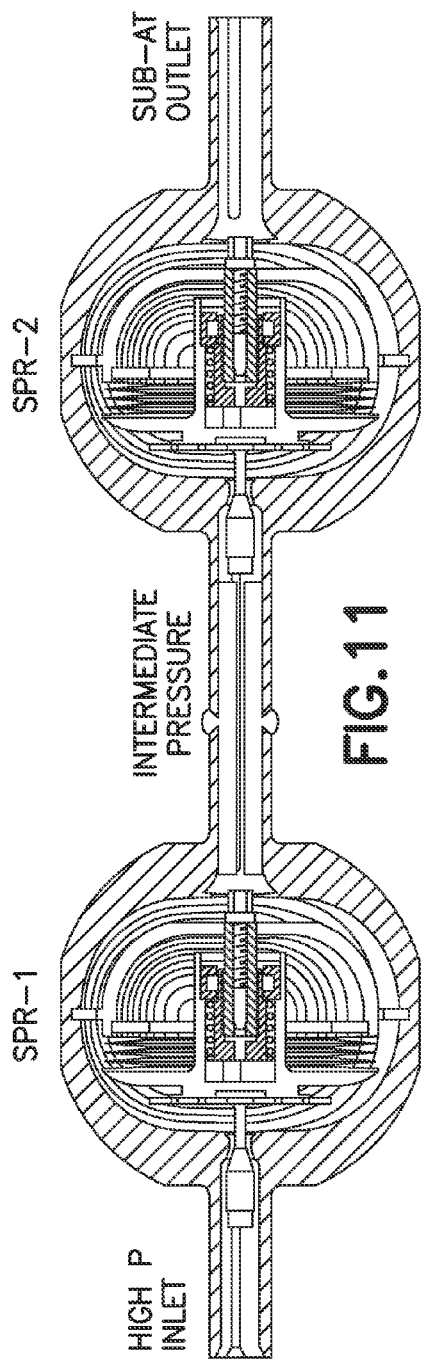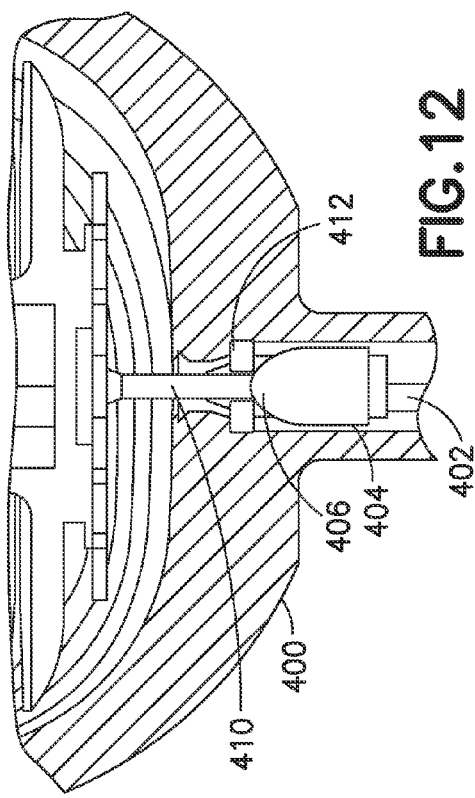

ANTI-SPIKE PRESSURE MANAGEMENT OF PRESSURE-REGULATED FLUID STORAGE AND DELIVERY VESSELS

CROSS-REFERENCE TO RELATED APPLICATIONS

This application is a U.S. national phase under the provisions of 35 U.S.C. § 371 of International Patent Application No. PCT/US13/61059 filed Sep. 20, 2013 in the names of Joseph R. Despres, et al. for ANTI-SPIKE PRESSURE MANAGEMENT OF PRESSURE-REGULATED FLUID STORAGE AND DISPENSING VESSELS, which in turn claims the benefit of priority under 35 U.S.C. § 119 of U.S. Provisional Patent Application No. 61/704,402 filed Sep. 21, 2012 in the names of Joseph R. Despres, et al. for ANTI-SPIKE PRESSURE MANAGEMENT OF PRESSURE-REGULATED FLUID STORAGE AND DISPENSING VESSELS. The disclosures of such International Patent Application No. PCT/US13/61059 and U.S. Provisional Patent Application No. 61/704,402 are hereby incorporated herein by reference in their respective entireties, for all purposes.

FIELD

The present disclosure relates to anti-spike pressure management of pressure-regulated fluid storage and dispensing vessels that can be susceptible to pressure-spiking behavior upon initiation of fluid dispensing operation. The pressure management arrangements and methods of the present disclosure are also contemplated for use in resolving continual periodic pressure spiking (oscillation) behavior, e.g., fluid pressure excursions of a recurrent episodic character.

DESCRIPTION OF THE RELATED ART

In the field of semiconductor manufacturing, various fluid supply packages are used to provide process fluids for use in the manufacturing operation and in ancillary fluid-utilizing processes such as process vessel cleaning. As a result of safety and process efficiency considerations, fluid supply packages have been developed that utilize fluid storage and dispensing vessels in which pressure-regulating devices are provided in the interior volume of the vessel or the vessel valve head. Examples of such fluid supply packages incorporating pressure-regulated vessels include the fluid supply packages commercially available from ATMI, Inc. (Danbury, Conn., USA) under the trademark VAC, the pressure-regulated vessel fluid supply packages commercially available from Praxair, Inc. under the trademark UPTIME, and fluid supply packages equipped with valve heads including regulator and flow control valve elements commercially available from L'Air Liquide (Paris, France) under the trademark SANIA.

In some instances, pressure-regulated vessels coupled to flow circuitry exhibit sudden pressure fluctuations upon initiation of fluid dispensing operation. This anomalous behavior is most frequently experienced as a pressure spike that is sensed by pressure sensing components in the flow circuitry. Such pressure spike behavior in previous semiconductor manufacturing operations has not been consequential, since this is a transient phenomenon that is quickly replaced by equilibrium flow (and thus the pressure spike is accommodated in the gradual progression of the process system to steady-state operating conditions), but recent trends in rapid beam tuning in ion implant applications have resulted in the process system being sensitive to this threshold fluctuation.

The occurrence of the pressure spike can cause flow circuitry components such as mass flow controllers to temporarily lose control, with the result that the process tool receiving the dispensed fluid receives out-of-specification fluid flow. In some instances, this may result in automatic process monitoring systems functioning to terminate operation, with consequent downtime adverse to the maintenance of manufacturing productivity. In other instances, the manufacturing tool may process the spike-associated sudden influx of fluid, with the result that out-of-specification product is produced.

Accordingly, the consequences of influent fluid pressure spikes in the fluid flow from pressure-regulated vessels can be severely detrimental to process efficiency and productivity.

SUMMARY

The present disclosure relates to anti-spike pressure management of pressure-regulated fluid storage and dispensing vessels that are susceptible to pressure-spiking behavior upon initiation of fluid dispensing operation.

In one aspect, the disclosure relates to a fluid supply package comprising a pressure-regulated fluid storage and dispensing vessel, a valve head adapted for dispensing of fluid from the vessel, and an anti-pressure spike assembly adapted to combat pressure spiking in flow of fluid at inception of fluid dispensing.

In another aspect, the disclosure relates to a fluid supply package of the foregoing type, wherein the anti-pressure spike assembly comprises at least one assembly selected from the group consisting of:

(1) assemblies adapted to adjust buffer volume between the fluid storage and dispensing vessel and a mass flow controller disposed in flow circuitry coupled to the vessel, so as to at least partially attenuate pressure-spiking behavior of fluid dispensed from the vessel at inception of fluid dispensing;

(2) pressure regulator assemblies in which internal friction necessary to open the poppet element of the pressure regulator in the vessel is effective to at least partially attenuate pressure-spiking behavior of fluid dispensed from the vessel at inception of fluid dispensing;

(3) assemblies that, immediately prior to initiating fluid flow, drop delivery line pressure slightly, by maintaining the delivery line in an evacuated state, and pulse a valve so as to drop pressure in the line, momentarily flowing a higher fluid flow rate through a mass flow controller disposed in flow circuitry coupled to the vessel, to correspondingly lower delivery line fluid pressure immediately prior to inception of fluid flow;

(4) assemblies that, immediately prior to initiating fluid flow, reduce delivery line pressure by pulsing directly to vacuum, or by flowing gas through a mass flow controller in the delivery line at an increased flow rate (in relation to normal flow rate of dispensed fluid), or by opening the delivery line directly to vacuum without pulsing; assemblies that prequalify a pressure-regulated vessel, by a quality assurance determination of pressure profile when the vessel is connected to a manifold that is at a pressure equal to or higher than the pressure regulator closure pressure and delivery line pressure is gradually decreased until the regulator opens, whereupon the shape of the pressure profile, at the time of regulator opening provides an indication of whether the pressure-sensitive element is sticking or not;

(5) regulator assemblies, comprising poppet and pressure regulator sealing surfaces adapted to prevent poppet sticking when the poppet is first opened, in which frictional force required to be overcome in displacing the poppet from its seating structure is effective to at least partially attenuate pressure-spiking behavior of fluid dispensed from the vessel at inception of fluid dispensing, wherein said regulator assemblies include one or more of: (i) materials of construction having a low level of deformation in use, (ii) poppets having a spherical sealing shape, (iii) poppet seating structure comprising a non-metallic material of construction, and (iv) poppets comprising metal material of construction and poppet seating structure comprising a fluid-compatible plastic material of construction;

(6) pressure regulators comprising a pressure-sensing assembly including one or more of: (i) a bellows structure having a number of diaphragm elements, material of construction, thickness, and elasticity, so that the travel distance of the poppet element at least partially attenuates pressure-spiking behavior of fluid dispensed from the vessel at inception of fluid dispensing; (ii) orifice size of the pressure regulator device that at least partially attenuates pressure-spiking behavior of fluid dispensed from the vessel at inception of fluid dispensing, (iii) regulator geometry that at least partially attenuates pressure-spiking behavior of fluid dispensed from the vessel at inception of fluid dispensing;

(7) regulator assemblies comprising one or more of: (i) multiple springs upstream of the poppet and arranged to assist in controlling poppet movement, as a damping element when the poppet element sticks and then suddenly opens; (ii) a pressure adjustment mechanism for increasing pressure within the pressure sensing assembly of the pressure regulator device, so that regulator outlet pressure is correspondingly increased, thereby shortening the period of time between inception of fluid flow and opening of the poppet element in the pressure regulator; (iii) a pressure adjustment mechanism for decreasing inlet pressure to the pressure regulator, so that the force exerted on the poppet element by fluid is reduced, thereby reducing the force required to be overcome upon opening of the poppet; (iv) a flow adjustment mechanism, operative to closely conform fluid flow to a fluid-utilizing apparatus; (v) filters positioned downstream of regulator(s), with a pore size that restricts high-end flow rates, and (vi) restricted flow orifice elements at an outlet of the regulator(s), e.g., including provision of a restricted flow orifice (RFO) device(s) and/or filter(s) between successive ones of series-connected pressure regulators, so that when a pressure regulator opens, the rate of gas flowing past the poppet is restrained to attenuate the pressure spike or to otherwise eliminate pressure oscillation issues;

(8) assemblies comprising at least one restricted flow orifice (RFO) element at a delivery port of the valve head of the fluid storage and dispensing vessel to at least partially attenuate pressure-spiking behavior of fluid dispensed from the vessel at inception of fluid dispensing;

(9) assemblies adapted to adjust pigtail volume between a delivery port of the fluid storage and dispensing vessel and a mass flow controller in an associated delivery line in fluid flow communication with said delivery port, so that the volume of fluid spiked to higher pressure and duration of flow perturbation incident to fluid pressure-spiking behavior are correspondingly reduced;

(10) assemblies adapted to limit fluid flow between successive ones of multiple pressure regulators in an interior volume of said fluid storage and dispensing vessel, comprising a flow path reducer in a conduit connecting said successive ones of said multiple pressure regulators;

(11) assemblies adapted to limit fluid flow between successive ones of multiple pressure regulators in an interior volume of said fluid storage and dispensing vessel, comprising a set point adjustment mechanism, arranged to modulate outlet pressure of a first, upstream one of said multiple pressure regulators, so that force on a poppet of a second, downstream regulator, and volume of fluid between the first and second pressure regulators is adjusted to an extent effective to at least partially attenuate pressure-spiking behavior of fluid dispensed from the vessel at inception of fluid dispensing;

(12) pressure regulator assemblies comprising a matably engageable poppet and seat structure, constructed and arranged so that contact between the poppet and seat structure when engaged with one another is made at an obtuse angle therebetween, wherein the poppet has a round, blunt sealing surface reposable on a flat cylindrical seat structure;

(13) pressure regulator assemblies comprising a matably engageable poppet and seat structure, wherein the seat structure comprises a hard, stiff, fluid-compatible polymer material and the poppet comprises a metal material;

(14) pressure regulator assemblies comprising a poppet stem and retainer spring assembly that attaches a poppet to a bellows of the pressure regulator, wherein a gap between the retainer spring and poppet stem has a gap dimension, that is effective to at least partially attenuate pressure-spiking behavior of fluid dispensed from the vessel at inception of fluid dispensing; and

(15) pressure regulator assemblies comprising a flow control element that is openable and closable in response to pressure at a discharge port of the fluid supply package, and pressurization/depressurization assemblies arranged to repetitively and alternatingly apply pressure and reduce pressure at the discharge port so that the flow control element of the pressure regulator assembly is cyclically opened and closed for a predetermined time period to stabilize pressure and suppress pressure oscillations in subsequent dispensing operation of the fluid supply package.

In a further aspect, the disclosure relates to a method for at least partially attenuating pressure-spiking behavior of fluid dispensed from a pressure-regulated fluid storage and dispensing vessel of a fluid supply package, comprising use of one or more pressure spike-attenuating assemblies of the type(s) described above.

Another aspect of the disclosure relates to a fluid supply package comprising a pressure-regulated vessel including a pressure regulator therein upstream of a discharge port of the vessel, said pressure regulator comprising a flow control element that is openable and closable in response to pressure at the discharge port, and a pressurization/depressurization assembly arranged to repetitively and alternatingly apply pressure and reduce pressure at the discharge port so that the flow control element of the pressure regulator assembly is cyclically opened and closed for a predetermined time period to stabilize pressure and suppress pressure oscillations in subsequent dispensing operation of the fluid supply package.

A further aspect of the disclosure relates to a method of suppressing pressure oscillations in gas dispensed from a pressure-regulated vessel, said method comprising repetitively and alternatingly applying pressure and reducing pressure at a discharge port of the vessel so that a flow control element of a pressure regulator in the vessel is cyclically opened and closed for a predetermined time period to stabilize pressure and suppress pressure oscillations in subsequent dispensing operation of the fluid supply package.

Other aspects, features and embodiments of the disclosure will be more fully apparent from the ensuing description and appended claims.

BRIEF DESCRIPTION OF THE DRAWINGS

FIG. 11 is a schematic cross-sectional elevation view of a series-arranged dual regulator assembly, of a type as shown and previously described with reference to FIG. 5, as modified to suppress pressure spike behavior, according to another embodiment of the disclosure.

FIG. 12 is an enlarged partial view of a pressure regulator of the general type shown in FIGS. 4 and 5, in which the seat structure of the inlet passage of the regulator as the poppet have been modified to at least partially attenuate pressure spike behavior on inception of dispensing operation.

DETAILED DESCRIPTION

Figure 1:
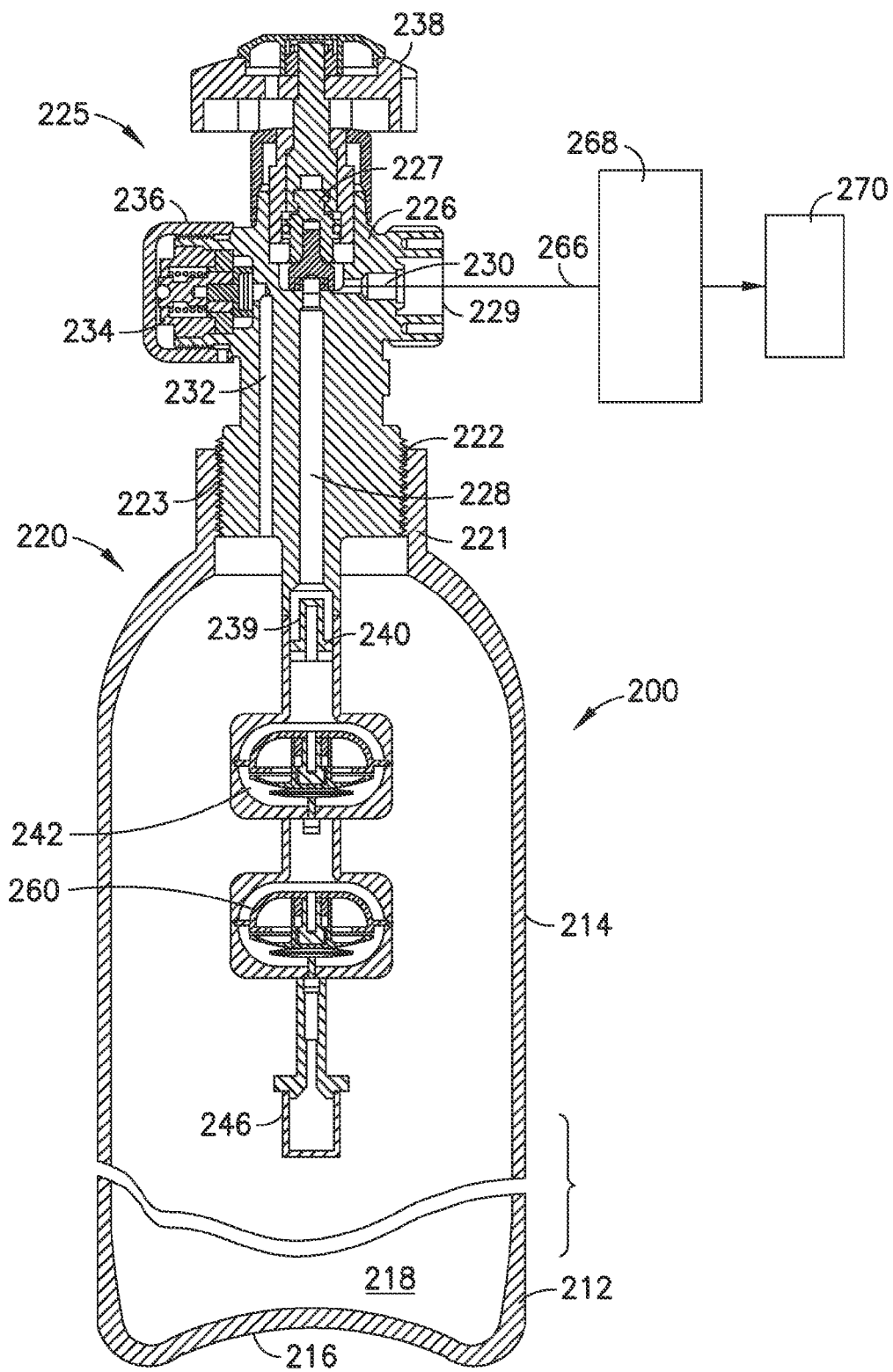
FIG. 1 is a schematic cross-sectional elevation view of a fluid supply package including a pressure-regulated fluid storage and dispensing vessel to which the anti-spike pressure management apparatus and method may be applied.

The present disclosure relates to anti-spike pressure management of pressure-regulated fluid storage and dispensing vessels that can be susceptible to pressure-spiking behavior upon initiation of fluid dispensing operation, and to pressure management arrangements and methods for combating continual periodic pressure spiking (oscillation) behavior, such as fluid pressure excursions of a recurrent episodic character.

As used herein, the term "pressure-regulated" in reference to fluid storage and dispensing vessels means that such vessels have at least one pressure regulator device, set pressure valve, or vacuum/pressure activated check valve disposed in an interior volume of the vessel and/or in a valve head of the vessel, with each such pressure regulator device being adapted so that it is responsive to fluid pressure in the fluid flow path immediately downstream of the pressure regulator device, and opens to enable fluid flow at a specific downstream reduced pressure condition in relation to the higher fluid pressure upstream of the pressure regulator device, and subsequent to such opening operates to maintain the pressure of fluid discharged from the pressure regulator device at a specific, or "set point," pressure level.

As previously described in the background section hereof, pressure-regulated vessels have been found to occasionally (or sporadically) exhibit sudden pressure fluctuations upon initiation of fluid dispensing operation when coupled to flow circuitry that subjects pressure regulator device(s) in the vessel to pressure conditions intended to open the pressure regulator device(s) to permit fluid flow therethrough. Such sudden pressure fluctuations constitute anomalous flow behavior that can severely and adversely impact fluid delivery and process monitoring operations associated with the pressure-regulated vessel. In many instances, pressure-regulated fluid storage and dispensing vessels have exhibited pressure spikes that exceed the capability of mass flow controller devices utilized in the fluid delivery line coupled to the vessel, to maintain steady state flow conditions. The result is flow fluctuation upon start-up of delivery of fluid or restart of such fluid delivery operation, before equilibrium flow conditions can be achieved. Previously, this anomaly if present was unnoticed or inconsequential, but recent trends in rapid beam tuning for ion implantation tools, has resulted in sensitivity of the process system to such fluctuation.

The present disclosure contemplates various approaches as "fixes" for such "pressure spike" behavior so that dispensing operation can be initiated more smoothly and without substantial pressure/flow rate fluctuation consequences. In such approaches, the pressure regulators are operated so that outlet pressure and flow from such devices are modulated to damp and at least partially attenuate any sudden pressure fluctuation at startup.

These various approaches in corresponding specific embodiments include the following operational techniques and arrangements:

(1) minimizing buffer volume between the fluid storage and dispensing vessel and mass flow controller disposed in flow circuitry coupled to the vessel;

(2) optimizing design of the pressure regulator to minimize internal friction necessary to open the poppet element of the pressure regulator in the vessel;

(3) immediately prior to initiating fluid flow, dropping delivery line pressure slightly, by maintaining the delivery line in an evacuated state, and pulsing a valve so as to drop pressure in the line, momentarily flowing a higher fluid flow rate through a mass flow controller disposed in flow circuitry coupled to the vessel, to correspondingly lower delivery line fluid pressure immediately prior to inception of fluid flow;

(4) immediately prior to initiating fluid flow, reducing delivery line pressure by pulsing directly to vacuum, or by flowing gas through a mass flow controller in the delivery line at an increased flow rate (in relation to normal flow rate of dispensed fluid), or by opening the delivery line directly to vacuum without pulsing;

(5) pre-qualifying a pressure-regulated vessel, by a quality assurance determination of pressure profile when the vessel is connected to a manifold that is at a pressure equal to or higher than the pressure regulator closure pressure and delivery line pressure is gradually decreased until the regulator opens, whereupon the shape of the pressure profile, at the time of regulator opening provides an indication of whether the pressure-sensitive element is sticking or not; improvements to the poppet and pressure regulator sealing surface to prevent sticking of the poppet when it is first opened, in which the poppet still provides positive closure and stoppage of fluid flow in the closed position, but wherein frictional force required to be overcome in displacing the poppet from its seating structure is minimized, in which such improvements include one or more of: (i) selection of alternative materials of construction, having a low level of deformation in use, (ii) modification of the shape of the poppet from a conventional conical sealing shape to a spherical sealing shape, (iii) use of a non-metallic material of construction for the poppet seating structure, and (iv) use of a metal poppet element and a fluid compatible plastic material of construction for the poppet seating structure;

(6) modifications of the bellows and pressure-sensing assembly of the pressure regulator device, to include one or more of: (i) modification of the bellows structure, such as by variation of the number of diaphragm elements, material of construction, thickness, and elasticity of the bellows, so that the travel distance of the poppet element is reduced; (ii) reduction of orifice size of the pressure regulator device, (iii) modification of geometry of the regulator;

(7) modification of design of the pressure regulator device, by one or more of: (i) addition of a spring upstream of the poppet element to assist in controlling poppet movement, as a damping element when the poppet element sticks and then suddenly opens; (ii) increasing pressure within the pressure sensing assembly of the pressure regulator device, so that regulator outlet pressure is correspondingly increased, thereby shortening the period of time between inception of fluid flow and opening of the poppet element in the pressure regulator; (iii) decreasing inlet pressure to the pressure regulator, so that the force exerted on the poppet element by fluid is reduced, thereby reducing the force required to be overcome upon opening of the poppet element; (iv) a flow adjustment mechanism, operative to closely conform fluid flow to a fluid-utilizing apparatus; (v) filters positioned downstream of regulator(s), with a pore size that restricts high-end flow rates, and (vi) restricted flow orifice elements at an outlet of the regulator(s), e.g., including provision of a restricted flow orifice (RFO) device(s) and/or filter(s) between successive ones of series-connected pressure regulators, so that when a pressure regulator opens, the rate of gas flowing past the poppet is restrained to attenuate the pressure spike or to otherwise eliminate pressure oscillation issues;

(8) deployment of smaller diameter restricted flow orifice (RFO) elements, at the delivery port of the fluid storage and dispensing vessel, to restrain maximum flow rate incident to a pressure spike event;

(9) minimization of "pigtail" volume between the delivery port of the fluid storage and dispensing vessel and the mass flow controller in the associated delivery line, so that the volume of fluid spiked to higher pressure is minimized and duration of flow perturbation incident to the spike is correspondingly reduced;

(10) minimization of volume between successive regulators in dual regulator arrangements, e.g., in which a first, upstream regulator effects fluid pressure reduction from a high storage pressure of the fluid in the vessel to an intermediate pressure that may for example be on the order of 100 psi (689.5 kPa), and in which the second, downstream regulator effects fluid pressure reduction from the intermediate pressure level on the order of 100 psi (689.5 kPa) to a lower pressure that may for example be on the order of 650 torr (86.7 kPa), by installation of a flow path reducer such as a metal sleeve that is operative to minimize the amount of intermediate-pressure gas exposed to the poppet element in the second, downstream regulator;

(11) reducing outlet pressure of a first, upstream regulator in a multiple regulator (2 or more regulators in series) arrangement, e.g., from 100 psi (689.5 kPa) to 10 psi (69 kPa), so that force on the second, downstream regulator poppet element is lessened, and so that volume of gas between the two pressure regulator devices is reduced;

(12) altering geometry of a matably engageable poppet element and seat structure of the pressure regulator, so that minimal contact is made at an obtuse angle between such elements, in order to minimize potential sticking behavior, e.g., wherein the poppet element has a round, blunt sealing surface reposing on a flat cylindrical (donut-shaped or washer-shaped) seating structure;

(13) modification of poppet element and seating structure materials of construction to minimize sticking behavior upon closing and opening of the pressure regulator, e.g., use of a hard, stiff, fluid compatible polymer material for the seating structure and metal for the face of the poppet element;

(14) redesign of the poppet stem and retainer spring assembly that attaches the poppet element to the bellows of the pressure regulator, to reduce the "play" in the positioning of the poppet element that otherwise might permit the poppet element to be misaligned, such as by reducing the gap between the retainer clip and shoulder on the poppet stem assembly in order to minimize displacement; and

(15) pressure-cycling a flow control element of a pressure regulator assembly between open and closed condition for a sufficient number of cycles to stabilize pressure and suppress pressure oscillations in subsequent dispensing operation of the fluid supply package.

Based on such techniques and arrangements, the fluid supply package may be configured and adapted in various embodiments to combat pressure spikes, oscillations and other anomalous flow behavior, by incorporation in the fluid supply package of corresponding anti-pressure spike assemblies or pressure management assemblies comprising at least one assembly selected from the group consisting of:

(1) assemblies adapted to adjust buffer volume between the fluid storage and dispensing vessel and a mass flow controller disposed in flow circuitry coupled to the vessel, so as to at least partially attenuate pressure-spiking behavior of fluid dispensed from the vessel at inception of fluid dispensing;

(2) pressure regulator assemblies in which internal friction necessary to open the poppet element of the pressure regulator in the vessel is effective to at least partially attenuate pressure-spiking behavior of fluid dispensed from the vessel at inception of fluid dispensing;

(3) assemblies that, immediately prior to initiating fluid flow, drop delivery line pressure slightly, by maintaining the delivery line in an evacuated state, and pulse a valve so as to drop pressure in the line, momentarily flowing a higher fluid flow rate through a mass flow controller disposed in flow circuitry coupled to the vessel, to correspondingly lower delivery line fluid pressure immediately prior to inception of fluid flow;

(4) assemblies that, immediately prior to initiating fluid flow, reduce delivery line pressure by pulsing directly to vacuum, or by flowing gas through a mass flow controller in the delivery line at an increased flow rate (in relation to normal flow rate of dispensed fluid), or by opening the delivery line directly to vacuum without pulsing; assemblies that pre-qualify a pressure-regulated vessel, by a quality assurance determination of pressure profile when the vessel is connected to a manifold that is at a pressure equal to or higher than the pressure regulator closure pressure and delivery line pressure is gradually decreased until the regulator opens, whereupon the shape of the pressure profile, at the time of regulator opening provides an indication of whether the pressure-sensitive element is sticking or not;

(5) regulator assemblies, comprising poppet and pressure regulator sealing surfaces adapted to prevent poppet sticking when the poppet is first opened, in which frictional force required to be overcome in displacing the poppet from its seating structure is effective to at least partially attenuate pressure-spiking behavior of fluid dispensed from the vessel at inception of fluid dispensing, wherein said regulator assemblies include one or more of: (i) materials of construction having a low level of deformation in use, (ii) poppets having a spherical sealing shape, (iii) poppet seating structure comprising a non-metallic material of construction, and (iv) poppets comprising metal material of construction and poppet seating structure comprising a fluid-compatible plastic material of construction;

(6) pressure regulators comprising a pressure-sensing assembly including one or more of: (i) a bellows structure having a number of diaphragm elements, material of construction, thickness, and elasticity, so that the travel distance of the poppet element at least partially attenuates pressure-spiking behavior of fluid dispensed from the vessel at inception of fluid dispensing; (ii) orifice size of the pressure regulator device that at least partially attenuates pressure-spiking behavior of fluid dispensed from the vessel at inception of fluid dispensing, (iii) regulator geometry that at least partially attenuates pressure-spiking behavior of fluid dispensed from the vessel at inception of fluid dispensing;

(7) regulator assemblies comprising one or more of: (i) multiple springs upstream of the poppet and arranged to assist in controlling poppet movement, as a damping element when the poppet element sticks and then suddenly opens; (ii) a pressure adjustment mechanism for increasing pressure within the pressure sensing assembly of the pressure regulator device, so that regulator outlet pressure is correspondingly increased, thereby shortening the period of time between inception of fluid flow and opening of the poppet element in the pressure regulator; (iii) a pressure adjustment mechanism for decreasing inlet pressure to the pressure regulator, so that the force exerted on the poppet element by fluid is reduced, thereby reducing the force required to be overcome upon opening of the poppet; (iv) a flow adjustment mechanism, operative to closely conform fluid flow to a fluid-utilizing apparatus; (v) filters positioned downstream of regulator(s), with a pore size that restricts high-end flow rates, and (vi) restricted flow orifice elements at an outlet of the regulator(s), e.g., including provision of a restricted flow orifice (RFO) device(s) and/or filter(s) between successive ones of series-connected pressure regulators, so that when a pressure regulator opens, the rate of gas flowing past the poppet is restrained to attenuate the pressure spike or to otherwise eliminate pressure oscillation issues;

(8) assemblies comprising at least one restricted flow orifice (RFO) element at a delivery port of the valve head of the fluid storage and dispensing vessel to at least partially attenuate pressure-spiking behavior of fluid dispensed from the vessel at inception of fluid dispensing;

(9) assemblies adapted to adjust pigtail volume between a delivery port of the fluid storage and dispensing vessel and a mass flow controller in an associated delivery line in fluid flow communication with said delivery port, so that the volume of fluid spiked to higher pressure and duration of flow perturbation incident to fluid pressure-spiking behavior are correspondingly reduced;

(10) assemblies adapted to limit fluid flow between successive ones of multiple pressure regulators in an interior volume of said fluid storage and dispensing vessel, comprising a flow path reducer in a conduit connecting said successive ones of said multiple pressure regulators;

(11) assemblies adapted to limit fluid flow between successive ones of multiple pressure regulators in an interior volume of said fluid storage and dispensing vessel, comprising a set point adjustment mechanism, arranged to modulate outlet pressure of a first, upstream one of said multiple pressure regulators, so that force on a poppet of a second, downstream regulator, and volume of fluid between the first and second pressure regulators is adjusted to an extent effective to at least partially attenuate pressure-spiking behavior of fluid dispensed from the vessel at inception of fluid dispensing;

(12) pressure regulator assemblies comprising a matably engageable poppet and seat structure, constructed and arranged so that contact between the poppet and seat structure when engaged with one another is made at an obtuse angle therebetween, wherein the poppet has a round, blunt sealing surface reposable on a flat cylindrical seat structure;

(13) pressure regulator assemblies comprising a matably engageable poppet and seat structure, wherein the seat structure comprises a hard, stiff, fluid-compatible polymer material and the poppet comprises a metal material;

(14) pressure regulator assemblies comprising a poppet stem and retainer spring assembly that attaches a poppet to a bellows of the pressure regulator, wherein a gap between the retainer spring and poppet stem has a gap dimension, that is effective to at least partially attenuate pressure-spiking behavior of fluid dispensed from the vessel at inception of fluid dispensing; and

(15) pressure regulator assemblies comprising a flow control element that is openable and closable in response to pressure at a discharge port of the fluid supply package, and pressurization/depressurization assemblies arranged to repetitively and alternatingly apply pressure and reduce pressure at the discharge port so that the flow control element of the pressure regulator assembly is cyclically opened and closed for a predetermined time period to stabilize pressure and suppress pressure oscillations in subsequent dispensing operation of the fluid supply package.

In the utilization of the above-described assemblies that, immediately prior to initiating fluid flow, reduce delivery line pressure by pulsing directly to vacuum, or by flowing gas through a mass flow controller in the delivery line at an increased flow rate (in relation to normal flow rate of dispensed fluid), or by opening the delivery line directly to vacuum without pulsing, there are various ways in which each of these operations can be carried out, with respect to flow circuitry and valve sequencing.

For example, evacuation of a delivery line may be carried out only back to a shut-off valve located in the delivery line. Alternatively, evacuation of the delivery line may be carried out back to the fluid storage and delivery vessel flow control valve. As a still further alternative, the delivery line flow circuitry may be evacuated all the way back to the regulator assembly in the pressure-regulated vessel. Once a particular required vacuum level is met, or once vacuum has been exerted on the delivery line for a prescribed time period, the normal flow of dispensed fluid can proceed. Such procedures, other than the approach of pulling vacuum all the way back to the pressure regulator in the fluid supply vessel, can be performed after initiation of dispensing fluid flow. In this manner, a vacuum will be maintained within some portion of the delivery line, and when fluid flow is restarted, the vacuum will have the tendency to force the poppet (or corresponding displaceable flow modulating element in the pressure regulator) to open sooner than it otherwise would. Further, this vacuum technique may eliminate the pressure spike altogether, since once the valves in the flow path are opened to fluid flow, the resulting delivery line pressure will be sufficiently low to cause the poppet or other flow modulating element in the pressure regulator to open immediately.

In the foregoing discussion relating to assemblies that are effective to at least partially attenuate pressure-spiking behavior of fluid dispensed from the vessel at inception of fluid dispensing, it is to be understood that the effectiveness being specified is in relation to a corresponding fluid supply package lacking the particular assembly that is being considered.

The present disclosure further contemplates methodologies for at least partially attenuating pressure-spiking behavior of fluid dispensed from a pressure-regulated fluid storage and dispensing vessel of a fluid supply package, comprising use of one or more pressure spike-attenuating assemblies described hereinabove.

The disclosure in one aspect relates to a fluid supply package comprising a pressure-regulated vessel including a pressure regulator therein upstream of a discharge port of the vessel, such pressure regulator comprising a flow control element that is openable and closable in response to pressure at the discharge port, and a pressurization/depressurization assembly arranged to repetitively and alternatingly apply pressure and reduce pressure at the discharge port so that the flow control element of the pressure regulator assembly is cyclically opened and closed for a predetermined time period to stabilize pressure and suppress pressure oscillations in subsequent dispensing operation of the fluid supply package.

The flow control element of the pressure regulator may comprise a poppet or other valve element or part of the pressure regulator.

In the aforementioned fluid supply package, the pressure-regulated vessel may comprise a series arrangement of pressure regulators in the interior volume of the vessel, e.g., two or more regulators in series. The set point of the pressure regulators may have any suitable value, and in various embodiments the pressure regulator immediately upstream of the discharge port may have a subatmospheric pressure set point.

The disclosure in another aspect relates to a method of suppressing pressure oscillations in gas dispensed from a pressure-regulated vessel, such method comprising repetitively and alternatingly applying pressure and reducing pressure at a discharge port of the vessel so that a flow control element of a pressure regulator in the vessel is cyclically opened and closed for a predetermined time period to stabilize pressure and suppress pressure oscillations in subsequent dispensing operation of the fluid supply package. In such method, the pressure-regulated vessel may comprise a series arrangement of pressure regulators in the interior volume of the vessel, and the pressure regulator immediately upstream of the discharge port may have a subatmospheric pressure set point.

Referring now to the drawings, FIG. 1 is a schematic cross-sectional elevation view of an illustrative fluid supply package 200 including a pressure-regulated fluid storage and dispensing vessel to which the anti-spike pressure management apparatus and method of the present disclosure may be applied.

The fluid supply package 200 includes a fluid storage and dispensing vessel 212 comprising a cylindrical sidewall 214 and a floor 216 corporately enclosing the interior volume 218 of the vessel. The side wall and floor may be formed of any suitable material of construction, e.g., metal, gas-impermeable plastic, fiber-resin composite material, etc., as appropriate to the gas to be contained in the vessel, the end use environment of the apparatus, and the pressure levels to be maintained in the vessel in storage and dispensing use.

At its upper end 220, the vessel features a neck 221 defining a port opening 222 bounded by the inner wall 223 of the neck 221. The inner wall 223 may be threaded or otherwise complementarily configured to matably engage therein a valve head 225 including valve body 226 that may be complementarily threaded or otherwise configured for such engagement.

In such manner, the valve head 225 is engaged with the vessel 212 in a leak-tight manner, to hold gas therein in the interior volume 218 at the desired storage conditions.

The valve head body 226 is formed with a central vertical passage 228 therein for dispensing of gas deriving from fluid in the vessel 212. The central vertical passage 228 communicates with the fluid discharge passage 230 of fluid discharge port 229, as shown.

The valve head body contains a valve element 227 that is coupled with the valve actuator 238 (hand wheel or pneumatic actuator), for selective manual or automated opening or closing of the valve. In this fashion, the valve actuator may be opened to flow gas through the central vertical passage 228 to the fluid discharge port 229, or alternatively the valve actuator may be physically closed, to terminate flow of fluid from the central vertical passage 228 to the fluid discharge port 229 during the dispensing operation.

The valve actuator thus can be any of various suitable types, e.g., manual actuators, pneumatic actuators, electromechanical actuators, etc., or any other suitable devices for opening and closing the valve in the valve head.

The valve element 227 is therefore arranged downstream of the regulator, so that fluid dispensed from the vessel flows through the regulator prior to flow through the flow control valve comprising valve element 227.

The valve head body 226 also contains a fill passage 232 formed therein to communicate at its upper end with a fill port 234. The fill port 234 is shown in the FIG. 1 drawing as capped by fill port cap 236, to protect the fill port from contamination or damage when the vessel has been filled and placed into use for the storage and dispensing of fluid from the contained fluid.

The fill passage at its lower end exits the valve head body 226 at a bottom surface thereof as shown. When the fill port 234 is coupled with a source of the gas to be contained in the vessel, the fluid can flow through the fill passage and into the interior volume 218 of the vessel 212.

Joined to the lower end of valve head body 226 is an extension tube 240, containing an upper particle filter 239 therein. Upper regulator 242 is mounted on the end of the extension tube 240. The upper regulator 242 is secured to the extension tube lower end in any suitable manner, as for example by providing internal threading in the lower end portion of the extension tube, with which the regulator 242 is threadably enagageable.

Alternatively, the upper regulator may be joined to the lower end of the extension tube by compression fittings or other leak-tight vacuum and pressure fittings, or by being bonded thereto, e.g., by welding, brazing, soldering, melt-bonding, or by suitable mechanical joining means and/or methods, etc.

The upper regulator 242 is arranged in series relationship with a lower regulator 260, as shown. For such purpose, the upper and lower regulators may be threadably engageable with one another, by complementary threading comprising threading on the lower extension portion of the upper regulator 242, and threading that is matably engageable therewith on the upper extension portion of the lower regulator 260.

Alternatively, the upper and lower regulators may be joined to one another in any suitable manner, as for example by coupling or fitting means, by adhesive bonding, welding, brazing, soldering, etc., or the upper and lower regulators may be integrally constructed as components of a dual regulator assembly.

At its lower end, the lower regulator 260 is joined to high efficiency particle filter 246.

The high efficiency particle filter 246 serves to prevent contamination of the regulator elements and valve element 227 with particulates or other contaminating species that otherwise may be present in the fluid flowed through the regulators and valves in the operation of the apparatus.

The embodiment shown in FIG. 1 also has a high efficiency particle filter 239 disposed in the extension tube 240, to provide further particulate removal capability, and to ensure high gas purity of the dispensed fluid.

Preferably, the regulator has at least one particle filter in series flow relationship with it. Preferably, as shown in the FIG. 1 embodiment, the system includes a particle filter upstream of the regulator(s), as well as a particle filter downstream of the regulator(s), in the fluid flow path from the vessel interior volume 218 to the fluid discharge port 229.

The valve head 225 in the FIG. 1 embodiment thus provides a two-port valve head assembly—one port is the gas fill port 234, and another port is the gas discharge port 229.

The pressure regulators in the FIG. 1 embodiment are each of a type including a diaphragm element coupled with a poppet-retaining wafer. The wafer in turn is connected to the stem of a poppet element, as part of a pressure sensing assembly that precisely controls outlet fluid pressure. A slight increase in outlet pressure above set point causes the pressure sensing assembly to contract, and a slight decrease in the outlet pressure causes the pressure sensing assembly to expand. The contraction or expansion serves to translate the poppet element to provide precise pressure control. The pressure sensing assembly has a set point that is pre-established or set for the given application of the fluid storage and dispensing system.

As illustrated, a gas discharge line 266, containing a flow control device 268 therein, is coupled with the discharge port 229. By this arrangement, the flow control device in the gas discharge line is opened to flow gas from the vessel 212 to the associated process facility 270 (e.g., a semiconductor manufacturing facility or other use facility), in the dispensing mode of the fluid storage and dispensing package 200, when fluid from the storage and dispensing vessel is flowed through the upstream (lower) regulator 260 and then through the downstream (upper) regulator 242 to the valve head to the discharge port 229. The flow control device 268 may be of any suitable type, and in various embodiments may comprise a mass flow controller.

The fluid dispensed in such manner will be at a pressure determined by the set point of the regulator 242.

The respective set points of the regulator 260 and the regulator 242 in the FIG. 1 embodiment may be selected or preset at any suitable values to accommodate a specific desired end use application.

For example, the lower (upstream) regulator 260 may have a set point that is in a range of from about 20 psig to about 2500 psig. The upper (downstream) regulator 242 may have a set point that is above the pressure set point of the lower (upstream) regulator 260, e.g., in a range of from about 1 torr up to 2500 psig.

In one illustrative embodiment, the lower (upstream) regulator 260 has a set point pressure value that is in the range of from about 100 psig to about 1500 psig, while the upper (downstream) regulator 242 has a set point pressure value in the range of from about 100 torr to about 50 psig, wherein the lower (upstream) pressure set point is above the set point of the upper (downstream) regulator.

Although the set points of the regulators in a serial regulator assembly may be established in any suitable ratio in relation to one another, in a two-regulator assembly such as shown in FIG. 1, the upstream regulator in preferred practice advantageously has a pressure set point that is at least twice the set point value (measured in the same pressure units of measurement) of the downstream regulator.

In the FIG. 1 embodiment, the lower and upper regulators are coaxially aligned with one another to form a regulator assembly having particulate filters on either end. As a consequence of such arrangement, the fluid dispensed from the vessel 212 is of extremely high purity.

As a further modification, the particulate filters may be coated or impregnated with a chemical adsorbent that is selective for impurity species present in the fluid to be dispensed (e.g., decomposition products deriving from reaction or degradation of the gas in the vessel). In this manner, the fluid flowing through the particulate filter is purified in situ along the flow path as it is being dispensed.

In one illustrative embodiment of a fluid storage and dispensing system of the type shown in FIG. 1, the vessel 212 is a 3AA 2015 DOT 2.2 liter cylinder. The high efficiency particle filter 246 is a GasShield™ PENTA™ point-of-use fluid filter, commercially available from Mott Corporation (Farmington, Conn.), having a sintered metal filtration medium in a housing of 316L VAR/electropolished stainless steel or nickel capable of greater than 99.9999999% removal of particles down to 0.003 micron diameter. The high efficiency particle filter 239 is a Mott standard 6610-1/4 in-line filter, commercially available from Mott Corporation (Farmington, Conn.). The regulators are HF series Swagelok® pressure regulators, with the upper (downstream) regulator 242 having a set point pressure in the range of from 100 Torr to 100 psig, and the lower (upstream) regulator 260 having a set point pressure in the range of from 100 psig to 1500 psig, and with the set point pressure of the lower (upstream) regulator 260 being at least twice the set point pressure of the upper (downstream) regulator 242. In a specific embodiment, the upper (downstream) regulator 242 may have an inlet pressure of 100 psig and outlet pressure of 500 torr, and the lower (upstream) regulator 260 may have an inlet pressure of 1500 psig and outlet pressure of 100 psig.

Figure 2:
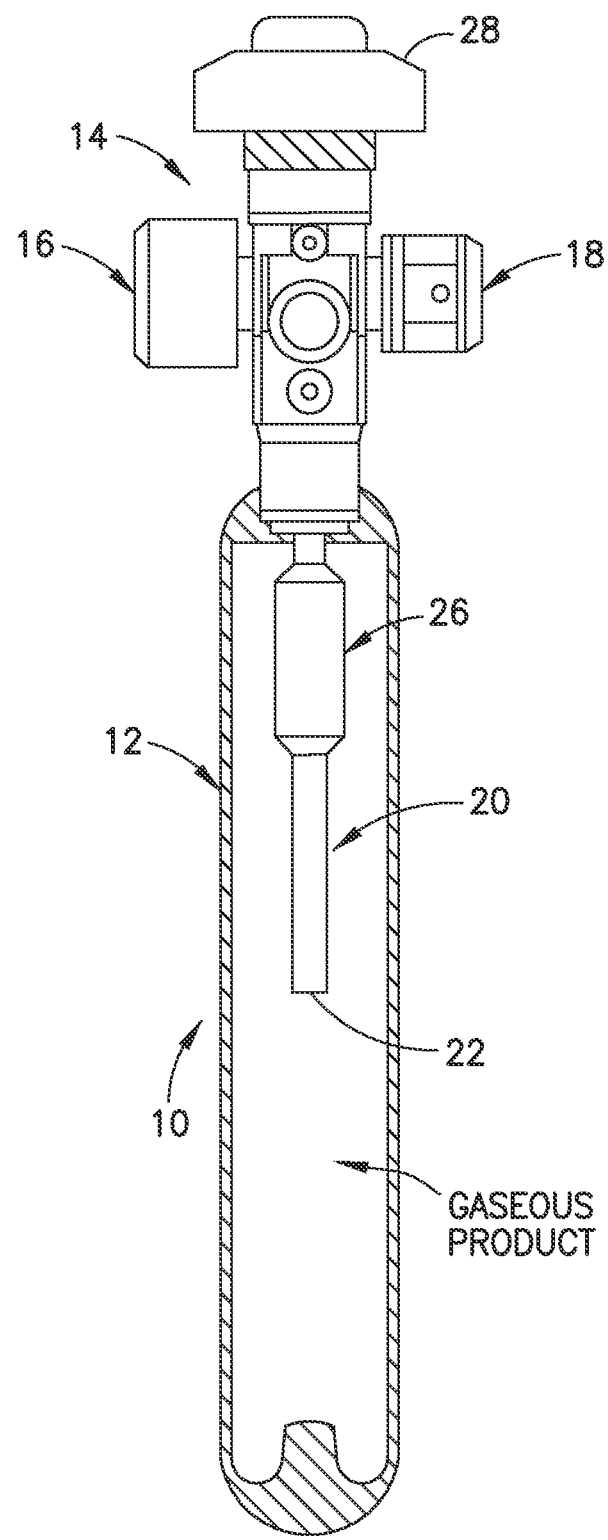
FIG. 2 is a schematic cross-sectional view of a system for the storage and controlled dispensation of a pressurized fluid therefrom, according to a further embodiment of the disclosure.

FIG. 2 is a schematic cross-sectional view of a system for the storage and controlled dispensation of a pressurized fluid therefrom, according to a further embodiment to which the anti-spike pressure management apparatus and method of the present disclosure may be applied.

As illustrated in FIG. 2, a system 10 for the storage and delivery of pressurized and toxic fluid is depicted. System 10 includes high pressure cylinder or tank 12 containing fluid, e.g., boron trifluoride, in gaseous or partially gaseous phase. The compressed gas cylinder can be a conventional 500 cc cylinder, such as the one approved by the Department of Transportation 3AA cylinder, but is not limited thereto. A cylinder valve head 14 is threadably engaged at the top end of cylinder 12. The cylinder valve head 14 can be a dual-port 316 stainless steel valve, such as the one manufactured by Ceodeux, Inc. The dual-port valve cylinder head 14 has a tamper-resistant fill port 16, through which cylinder 12 is filled with product. Upon filling, the user can draw product from the cylinder through user port 18, which is a face-seal VCR™ port having an outlet opening ranging from about 0.25 to about 0.5 inches. The interior of the cylinder contains an internal flow restrictor 20 having an inlet 22. The flow restrictor 20 can comprise a capillary flow restrictor, e.g., comprising multiple capillary flow passages. Until exhausted, fluid flows into inlet 22, through the internal flow restrictor and a vacuum actuated check valve 26, along a fluid flow path, described in detail below, to user port 18.

Vacuum actuated check valve 26 contains a bellows chamber that automatically controls the discharge of fluid from the cylinder. The check valve 26 can be disposed in the port body of the dual-port valve, upstream of the dual-port valve, within the cylinder or partly in the dual-port valve and partly within the cylinder along the fluid flow path. As shown in the exemplary embodiment of FIG. 2, the vacuum actuated check valve is fully disposed inside cylinder 12, by affixing one portion of the check valve to the housing which is located along the fluid discharge path. A handle 28 at the top of dual-port valve allows manual control of the fluid along the fluid discharge path leading to user port 18. This type of fluid storage and dispensing system is described in U.S. Pat. Nos. 5,937,895, 6,007,609, 6,045,115, and 7,905,247, albeit with the first three of such patents referencing a single port valve cylinder head, however the disclosure of all of such patents are incorporated herein by reference in their respective entireties.

The FIG. 2 fluid supply package can be employed for sub-atmospheric pressure dopant gas delivery for ion implantation. Regardless of cylinder temperature, elevation or fill volume, the system delivers product only when a vacuum level between 500-100 torr is applied to the use port. Product cannot flow from the fluid supply package without such vacuum.

Fluid stored in and dispensed from the fluid supply package of the disclosure may be of any suitable type, and may for example comprise a fluid having utility in semiconductor manufacturing, manufacture of flat-panel displays, or manufacture of solar panels.

The fluid contained in the fluid storage and dispensing vessel may for example comprise a hydride fluid for semiconductor manufacturing operations. Examples of hydride fluids of such type include arsine, phosphine, stibine, silane, chlorosilane, diborane, germane, disilane, trisilane, methane, hydrogen selenide, hydrogen sulfide, and hydrogen. Other fluids useful in semiconductor manufacturing operations may be employed, including acid fluids such as hydrogen fluoride, boron trichloride, boron trifluoride, diboron tetrafluoride, hydrogen chloride, halogenated silanes (e.g., $SiF_4$) and disilanes (e.g., $Si_2F_6$), $GeF_4$, $PF_3$, $PF_5$, $AsF_3$, $AsF_5$, He, $N_2$, $O_2$, $F_2$, Xe, Ar, Kr, CO, $CO_2$, $CF_4$, $CHF_3$, $CH_2F_2$, $CH_3F$, $NF_3$, $COF_2$, as well as mixtures of two or more of the foregoing, etc., having utility in semiconductor manufacturing operations as halide etchants, cleaning agents, source reagents, etc. Other reagents which may be thus stored and delivered include gaseous organometallic reagents used as precursors for metalorganic chemical vapor deposition (MOCVD) and atomic layer deposition (ALD).

Figure 3:
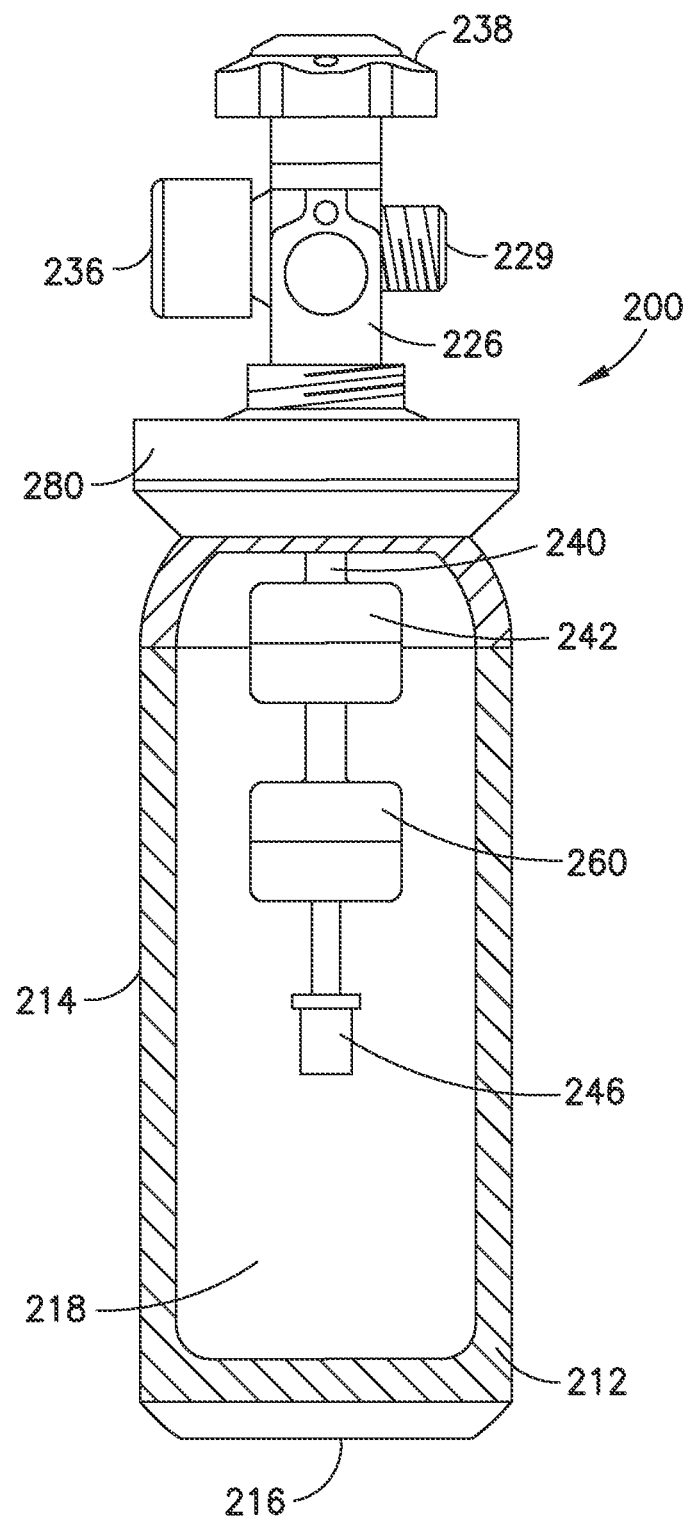
FIG. 3 is a schematic elevation view, in partial cross-section, of a fluid supply package of the general type schematically shown in FIG. 1, and wherein corresponding parts are correspondingly numbered for ease of reference.

FIG. 3 is a schematic elevation view, in partial cross-section, of a fluid supply package of the general type schematically shown in FIG. 1, and wherein corresponding parts are correspondingly numbered for ease of reference. The FIG. 3 fluid supply package differs from that shown in FIG. 1, in the provision in the FIG. 3 package of a collar flange member 280 coupled to the neck of the vessel 212. The valve head body 226 in the FIG. 3 package is secured to the collar flange member 280.

Figure 4:
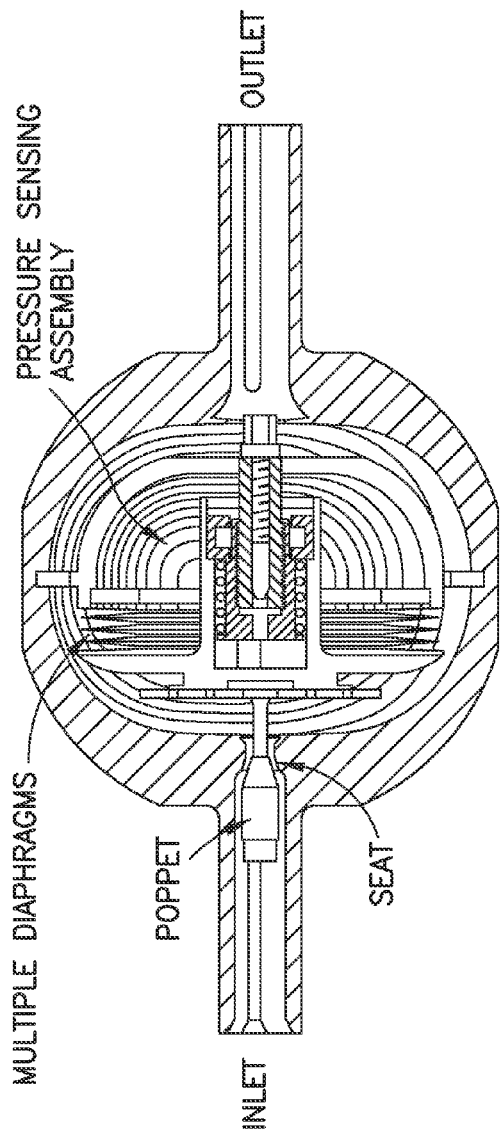
FIG. 4 is a cross-sectional view of a pressure regulator of the general type utilized in the vessels shown and described with respect to the FIGS. 1 and 3.

FIG. 4 is a cross-sectional view of a pressure regulator of the general type utilized in the vessels shown and described with respect to the FIGS. 1 and 3. Such pressure regulator is described in U.S. Pat. No. 5,303,734, the disclosure of which is hereby incorporated herein by reference in its entirety. As illustrated, the pressure regulator includes a main central housing communicating with inlet and outlet passages. A poppet is reposed in the inlet passage, and is shown in closed position, as engaged with the seat of the inlet passage, to close such passage to fluid flow. The poppet is coupled with a stem that in turn is connected to the pressure sensing assembly in the interior volume of the pressure regulator. The pressure sensing assembly includes multiple diaphragms defining a bellows structure, in which the pressure sensing assembly is responsive to pressure level in the outlet passage of the regulator, such that pressure in the outlet passage that is below a predetermined setpoint pressure will cause movement of the multiple diaphragms and corresponding translation of the pressure sensing assembly and poppet stem coupled there with, so that the poppet is disengaged from its seat, to allow fluid flow through the inlet passage and central chamber of the regulator to the outlet passage, for flow of fluid from the discharge opening of the outlet passage.

When fluid pressure in the outlet passage is above the set point pressure of the regulator, the pressure sensing assembly will responsively translate the poppet stem and associated poppet, so that the poppet engages the seat of the inlet passage, to close the passage to fluid flow therethrough.

Figure 5:
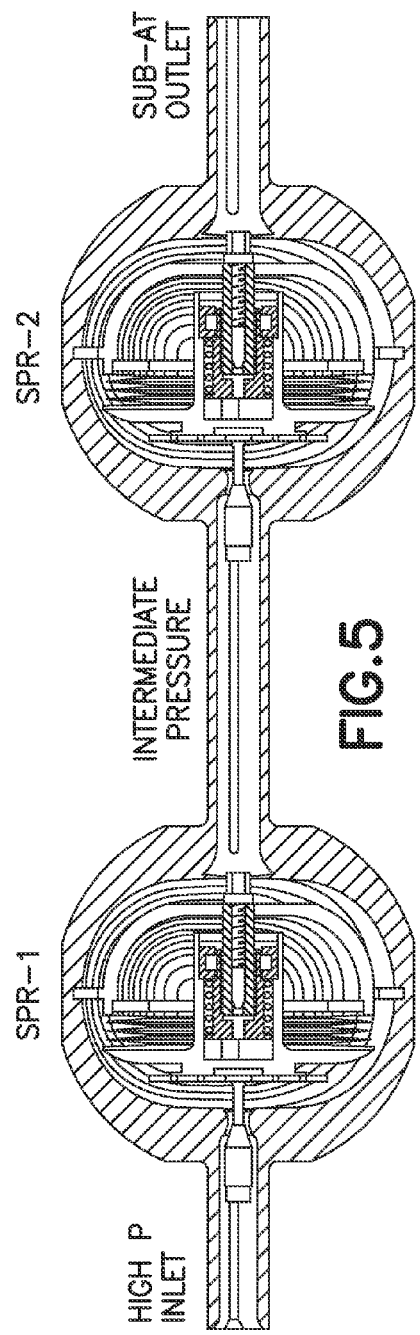
FIG. 5 is a schematic representation of a series-arranged dual regulator assembly, of a type as shown and described with reference to the fluid supply package of FIGS. 1 and 3.

FIG. 5 is a schematic representation of a series-arranged dual regulator assembly, of a type as shown and described with reference to the fluid supply package of FIGS. 1 and 3.

In this series-arranged regulator assembly, a first pressure regulator SPR-1 is in series with a second pressure regulator SPR-2. The respective regulators are coupled with one another by an intermediate pressure connection passage. Regulator SPR-1 has a higher pressure set point in relation to the pressure set point of regulator SPR-2. Regulator SPR-1 is disposed with its high pressure inlet (High P Inlet)

exposed to high pressure fluid when the regulator assembly is installed in a fluid storage and dispensing vessel as shown in FIGS. 1 and 3. Regulator SPR-2 is disposed in series with regulator SPR-1, and may for example have a set point pressure that is a subatmospheric pressure, so that the downstream regulator (SPR-2) will not dispense fluid unless its outlet (Sub-At Outlet) is below the subatmospheric set point pressure of such regulator SPR-2.

Accordingly, when regulator SPR-2 opens in response to outlet pressure below the set point subatmospheric pressure, there is a corresponding reduction in pressure in the intermediate pressure connection passage between the two regulators, and when such intermediate pressure has been reduced below the set point pressure of regulator SPR-1, then regulator SPR-1 will open, and fluid will flow from the high-pressure inlet of regulator SPR-1 through such regulator, through the intermediate pressure connection passage and through the regulator SPR-2 to the subatmospheric pressure outlet.

By such arrangement, a high-pressure fluid is contained in a safe and effective manner in the fluid storage and dispensing vessel, and pressure of such fluid in dispensing is reduced by the upstream pressure regulator to an intermediate pressure, and by the downstream pressure regulator from such intermediate pressure to the lower discharge pressure determined by the set point of the downstream pressure regulator.

Figure 6:
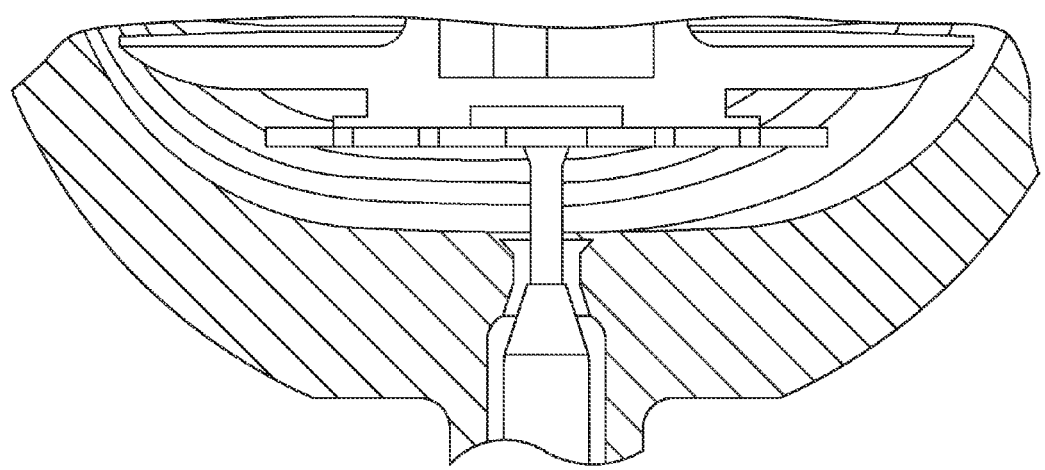
FIG. 6 is in large partial view of a pressure regulator of the general type shown in FIGS. 4 and 5, showing the conical end section of the poppet seated in the inlet passage of the pressure regulator, so as to occlude such passage and prevent fluid flow.

FIG. 6 is an enlarged partial view of a pressure regulator of the general type shown in FIGS. 4 and 5, showing the conical end section of the poppet seated in the inlet passage of the pressure regulator, so as to occlude such passage and prevent fluid flow. Such occluding position is in response to the downstream pressure in the outlet passage of the pressure regulator being above the set point pressure of the regulator. The seating position of the poppet is a site of potential sticking of the poppet that may give rise to the aforementioned pressure spike behavior upon inception of fluid flow from the fluid storage and dispensing vessel of the fluid supply package.

Figure 7:
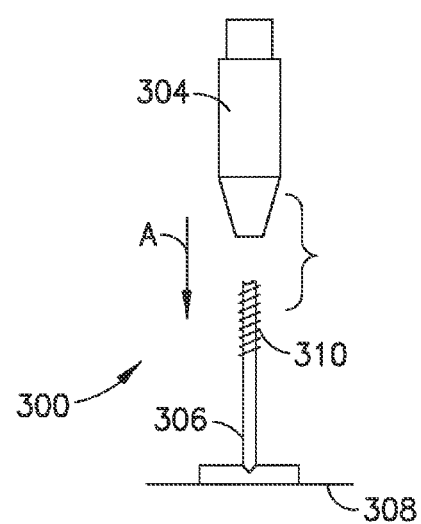
FIG. 7 is an exploded view of a poppet and stem assembly utilized in a pressure regulator of the type shown in FIGS. 4-6.

FIG. 7 is an exploded view of a poppet stem assembly 300 utilized in a pressure regulator of the type shown in FIGS. 4-6. The poppet stem assembly includes the poppet 304 that engages, when threaded in the direction indicated by arrow A, the poppet base structure including baseplate 308, to which poppet stem 306 is secured, with helical threads 310 disposed at an upper end of the poppet stem.

Figure 8:
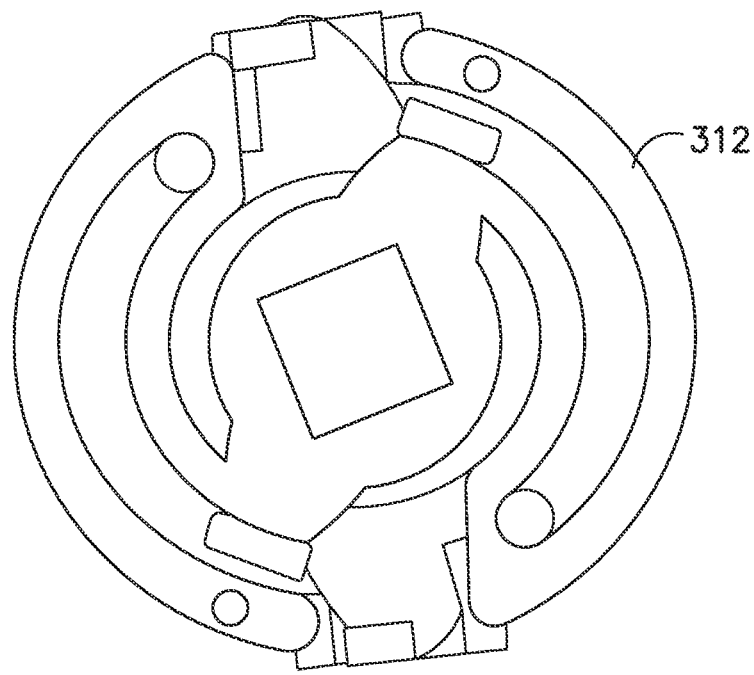
FIG. 8 is a top plan view of a poppet retainer spring member which cooperatively mates with the poppet spring assembly of FIG. 7.

FIG. 8 is a top plan view of a poppet retainer spring member 312 cooperatively matable with the poppet stem assembly of FIG. 7.

Figure 9:
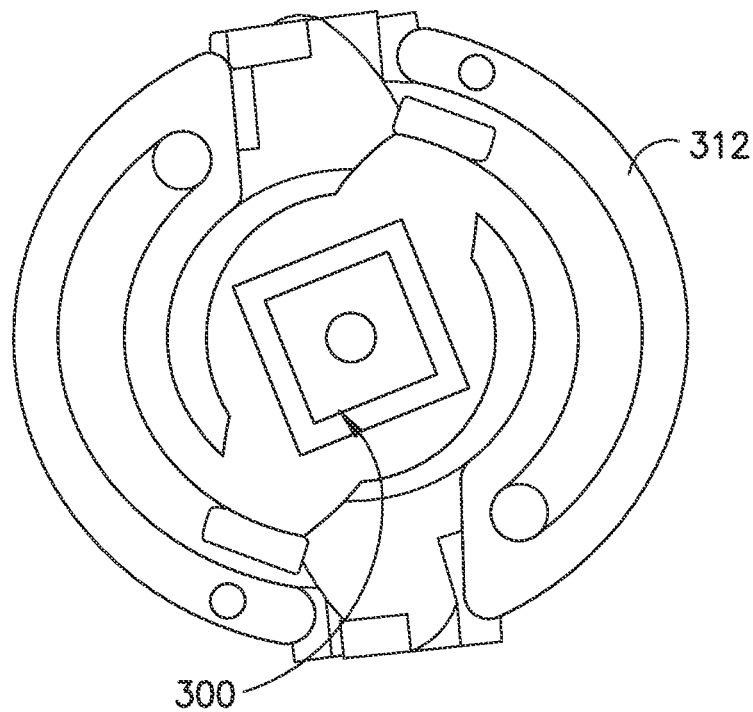
FIG. 9 is a top plan view of the assembled poppet stem and retainer spring assembly incorporating the poppet stem assembly of FIG. 7 and the poppet retainer spring member of FIG. 8.

FIG. 9 is a top plan view of the assembled poppet stem and retainer spring assembly incorporating the poppet stem assembly 300 of FIG. 7 and the poppet spring retainer member 312 of FIG. 8. The spring assembly clips into the surface of the bellows in the pressure regulator, and physically retains the poppet stem 306. The spring 312 has a spacing gap that may for example be on the order of 1 mm in perpendicular directions of movement, in order to allow movement of the poppet for alignment purposes. As a result of such spacing gap being present, the poppet stem may vary in position, and alignment may consequently be poor or inconsistent, contributing to potential pressure spike behavior upon inception of flow through the regulator during dispensing operation.

To address such alignment and position issues, the present disclosure contemplates significant reduction of spacing gap dimensions between the retaining spring and the poppet stem assembly, as compared to dimensions, conventionally used in such pressure regulators. For example, in regulators, conventionally manufactured with the aforementioned 1 mm spacing gap dimensions, a reduction of the spacing gap to dimensions on the order of 0.25 mm is contemplated to correspondingly markedly reduce potential misalignment, and thereby to ameliorate pressure spike events associated with such misalignment.

Figure 10:
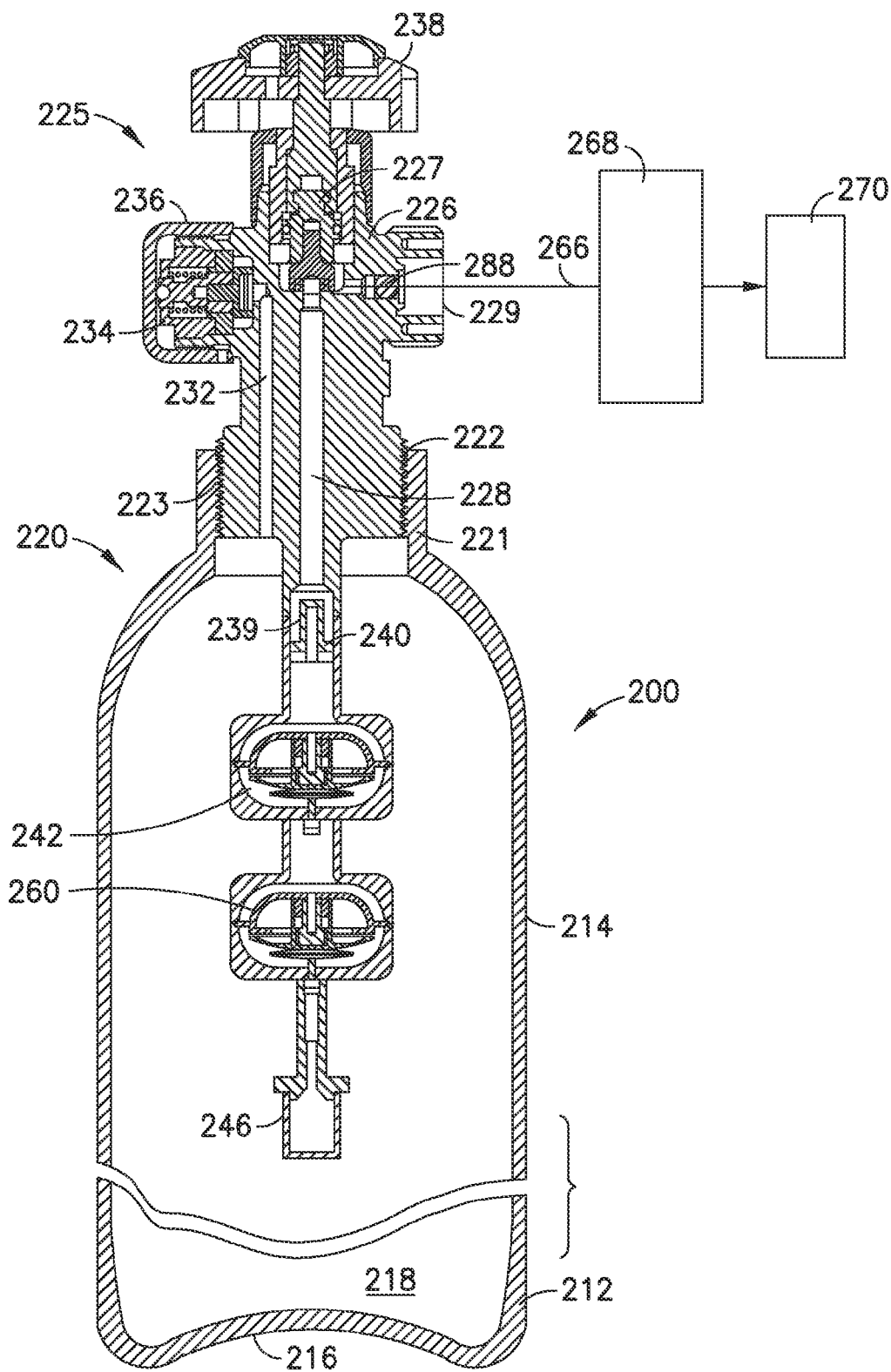
FIG. 10 is a schematic cross-sectional elevation view of a fluid supply package of a type as shown in FIG. 1, as modified by incorporation of a restricted flow orifice (RFO) element in the fluid discharge passage of the fluid discharge port to suppress pressure spike behavior on inception of dispensing operation.

FIG. 10 is a schematic cross-sectional elevation view of a fluid supply package of a type as shown in FIG. 1, wherein all corresponding elements and features are correspondingly numbered for ease of reference, but wherein the valve head body 226 has been modified by incorporation of a restricted flow orifice (RFO) element 288 in the fluid discharge passage of the fluid discharge port 229 to suppress pressure spike behavior on inception of dispensing operation. By such arrangement, the restricted flow orifice will limit the rate of potential spike/surge flow of fluid from the fluid supply package, and thereby serve to damp and at least partially attenuate spike/surge behavior. Such RFO element 288 may be threaded into discharge port 229 or otherwise mechanically inserted, affixed, or attached so as to control the maximum fluid discharge rate from the fluid supply package 200.

FIG. 11 is a schematic cross-sectional elevation view of a series-arranged dual regulator assembly, of a type as shown and previously described with reference to FIG. 5, as modified to suppress pressure spike behavior, according to another embodiment of the disclosure.

In the FIG. 11 series-arranged regulator assembly, the intermediate pressure connection passage between the first pressure regulator SPR-1 and second pressure regulator SPR-2 is fabricated with an insert therein, of annular shape, to provide a central narrow bore opening in the intermediate pressure connection passage, for restricted flow of fluid therethrough.

The annular insert may be installed during weld assembly of the series-arranged dual regulator assembly, to reduce fluid volume between the set point regulators SPR-1 and SPR-2. By restricting the volumetric fluid load passing through the intermediate pressure connection passage, there will be correspondingly less fluid susceptible to surge/spike behavior when the set point regulator SPR-2 first opens in the dispensing operation. As a result, the magnitude and temporal extent of any pressure perturbation is damped and at least partially attenuated, in relation to a corresponding series-arranged dual regulator assembly lacking such annular insert in the intermediate pressure connection passage.

Additionally, or alternatively, a series-arranged dual regulator assembly, of a type as shown and previously described with reference to FIG. 5, can be modified by reduction of the pressure set point on the upstream (higher pressure) regulator, to reduce fluid volume in the intermediate pressure connection passage between the regulators. For example, an upstream regulator in a fluid dispensing package of the type shown in FIG. 1 may typically have a set point pressure on the order of 100 psi (689.5 kPa), and such set point pressure of the upstream regulator can be reduced, e.g., to pressure on the order of 10 psi (68.9 kPa), in order to attenuate pressure spike behavior on inception of dispensing operation.

FIG. 12 is an enlarged partial view of a pressure regulator 400 of the general type shown in FIGS. 4 and 5, in which the seat structure 412 of the inlet passage 402 of the regulator has been modified to a donut-form structure of flat annular disk-like character, in relation to the structure shown in FIG. 6. In addition, the poppet 404 mounted on poppet stem 410 has been modified to provide a larger round, blunt profile at its proximal end 406, for matably sealingly engaging the seat structure. In this embodiment, the seat structure may be formed of any suitable material, and may for example comprise a hard, stiff, fluid compatible polymer, such as a polyacetal material. Likewise, the poppet may be formed of any suitable material compatible with the seat structure, and may for example be formed of a metal, such as stainless steel, titanium, nickel, or other metal or material of construction that is compatible with the other components of the poppet assembly and regulator, as well as the fluids to be flowed through such regulator in use.

Figure 13:
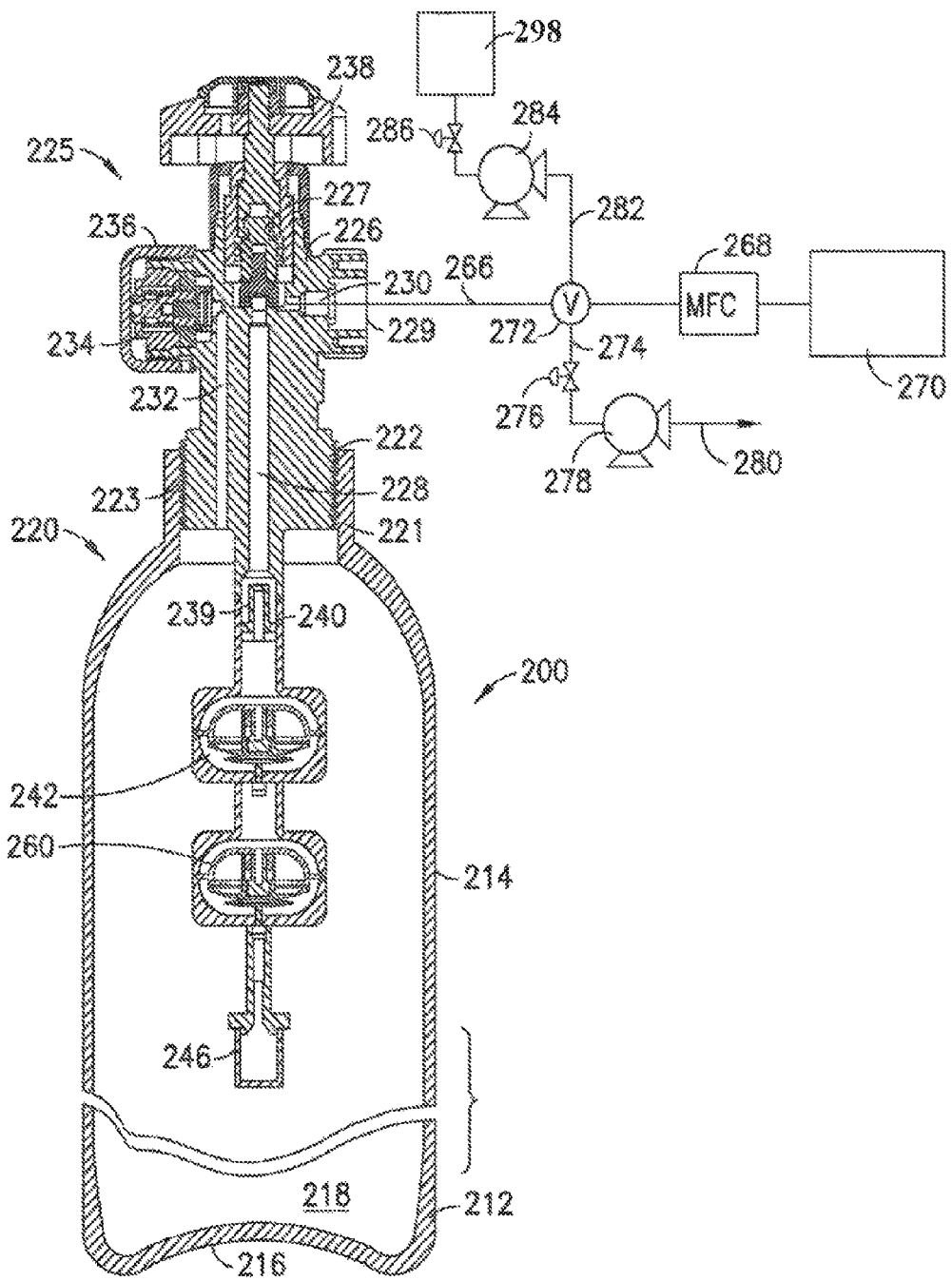
FIG. 13 is a schematic cross-sectional elevation view of a fluid supply package including a pressure-regulated fluid storage and dispensing vessel to which an anti-spike pressure management apparatus and method are applied, according to one embodiment of the present disclosure.

FIG. 13 is a schematic cross-sectional elevation view of a fluid supply package including a pressure-regulated fluid storage and dispensing vessel to which an anti-spike pressure management apparatus and method are applied, according to one embodiment of the present disclosure. In FIG. 13, corresponding features are correspondingly numbered with respect to the fluid supply package shown in FIG. 1.

As shown in FIG. 13, the fluid supply package 200 includes a fluid storage and dispensing vessel 212 comprising a cylindrical sidewall 214 and a floor 216 corporately enclosing the interior volume 218 of the vessel. At its upper end 220, the vessel features a neck 221 defining a port opening 222 bounded by the inner wall 223 of the neck 221. The inner wall 223 is configured to matably engage therein a valve head 225 including valve body 226, as previously described.

The valve head 225 is engaged with the vessel 212 in a leak-tight manner, to hold gas in the interior volume 218 at desired storage conditions. The valve head body 226 is formed with a central vertical passage 228 for dispensing of gas deriving from fluid in the vessel 212. The central vertical passage 228 communicates with the fluid discharge passage 230 of fluid discharge port 229.

The valve head body contains a valve element 227 that is coupled with the valve actuator 238 for selective opening or closing of the valve. The valve actuator may be opened to flow gas through the central vertical passage 228 to the fluid discharge port 229, or alternatively the valve actuator may be closed to terminate fluid flow from the central vertical passage 228 to the fluid discharge port 229 during dispensing.

The valve element 227 is downstream of the regulator, so that fluid dispensed from the vessel flows through the regulator prior to flow through the flow control valve comprising valve element 227.

The valve head body 226 contains fill passage 232 communicating at its upper end with a fill port 234. The fill port 234 is capped by fill port cap 236, to protect the fill port from contamination or damage when the vessel after filling is used to store and dispense gas.

The fill passage at its lower end exits the valve head body 226 at a bottom surface thereof. When the fill port 234 is coupled with a gas source, the fluid can flow through the fill passage and into the interior volume 218 of the vessel 212.

Joined to the lower end of the valve head body 226 is an extension tube 240, containing an upper particle filter 239 therein. Upper regulator 242 is mounted on the end of the extension tube 240. The upper regulator 242 is secured to the extension tube lower end.

The upper regulator 242 is arranged in series relationship with a lower regulator 260, as shown. For such purpose, the upper and lower regulators may be threadably engageable with one another, by complementary threading comprising threading on the lower extension portion of the upper regulator 242, and threading that is matably engageable therewith on the upper extension portion of the lower regulator 260.

Alternatively, the upper and lower regulators may be joined by coupling or fitting elements, by adhesive bonding, welding, brazing, soldering, etc., or the upper and lower regulators may be integrally constructed as components of a dual regulator assembly.

At its lower end, the lower regulator 260 is joined to particle filter 246 that serves to prevent contamination of the regulator elements and valve element 227 with particulates or other contaminating species in the operation of the apparatus. A particle filter 239 is disposed in the extension tube 240, to provide further particulate removal capability, and ensure high gas purity of the dispensed fluid.

The regulator may have at least one particle filter in series flow relationship with it. Preferably, the system includes a particle filter upstream of the regulator(s), as well as a particle filter downstream of the regulator(s), in the fluid flow path from the vessel interior volume 218 to the fluid discharge port 229.

The valve head 225 thus provides a two-port valve head assembly—gas fill port 234, and gas discharge port 229.

The pressure regulators are each of a type including a diaphragm element coupled with a poppet-retaining wafer. The wafer in turn is connected to the stem of a poppet element, as part of a pressure sensing assembly that precisely controls outlet fluid pressure. A slight increase in outlet pressure above set point causes the pressure sensing assembly to contract, and a slight decrease in the outlet pressure causes the pressure sensing assembly to expand. The contraction or expansion serves to translate the poppet element to provide precise pressure control. The pressure sensing assembly has a set point that is pre-established or set for the given application of the fluid storage and dispensing system.

As illustrated, a gas discharge line 266, containing a mass flow controller 268 therein, is coupled with the discharge port 229. By this arrangement, the mass flow controller in the gas discharge line is opened to flow gas from the vessel 212 to the associated process facility 270 (e.g., a semiconductor manufacturing facility or other use facility), in the dispensing mode of the fluid storage and dispensing package 200, when fluid from the storage and dispensing vessel is flowed through the upstream (lower) regulator 260 and then through the downstream (upper) regulator 242 to the valve head to the discharge port 229.

The fluid dispensed in such manner will be at a pressure determined by the set point of the regulator 242. The respective set points of the regulator 260 and the regulator 242 can be selected or preset at any suitable values. The lower and upper regulators are coaxially aligned with one another to form a regulator assembly having particulate filters on either end so that the fluid dispensed from the vessel 212 is of extremely high purity.

In order to enable the vessel to deliver gas at consistent pressure without exhibiting oscillation of delivery pressure that negatively impacts the downstream process facility 270 and causes flow disruptions, the gas supply apparatus of FIG. 13 includes a cycling valve 272 in the gas discharge line 266 that is selectively cycleable to establish fluid flow communication between the gas discharge line 266 and one of branch line 274 and 282. Branch line 274 has a flow isolation valve 276 therein and is coupled with a pump 278 arranged to exert suction on gas discharge line 266, and to discharge gas in exhaust line 280. Branch line 282 contains pressurizing pump 284 therein and is joined to pressurizing gas source 298, with isolation valve 286 in such line serving to control flow of pressurized gas to the pressurizing pump 284.

In order to prevent delivery pressure oscillation at the inception of gas dispensing from the fluid supply package 200, the poppet element of regulator 242 in the vessel 214 is cycled by actuating the cycling valve 272 so that during a first period of operation, the pressurizing pump 284 is actuated and pressurizing fluid is flowed from pressurizing gas source 298 through line 282, valve 272, and back in gas discharge line 266 to the discharge port 229. In this manner, the discharge port 229 is back-pressured to a predetermined pressure for a predetermined period of time, following which the cycling valve 272 is cycled to close the gas discharge line to flow communication with branch line 282, and to open it to branch line 274 with the suction pump 278 actuated, to exert suction on the discharge port 229 for a second predetermined period of time. In this manner, the pressure in the gas discharge line 266 experienced by the discharge port 229 cycles between pressure above the set point of the regulator 242 and suction pressure condition below the set point of the regulator 242, so that the poppet of the regulator 242 opens and closes.

Such alternation of pressure conditions to cause the regulator poppet to successively open and close is continued for a sufficient number of cycles to cause the subsequent dispensing of gas from the vessel 214 to occur without pressure oscillations.

In a specific example, the cycling procedure involves back-pressuring the discharge port to about 700 torr for 12 seconds and then pumping on the discharge port for 12 seconds in order to force the poppet in the regulator open and closed, with such alternation continuing for 500-1000 cycles, following which the delivery pressure of the dispensed gas will exhibit a stabilized and non-oscillatory character.

Figure 14:
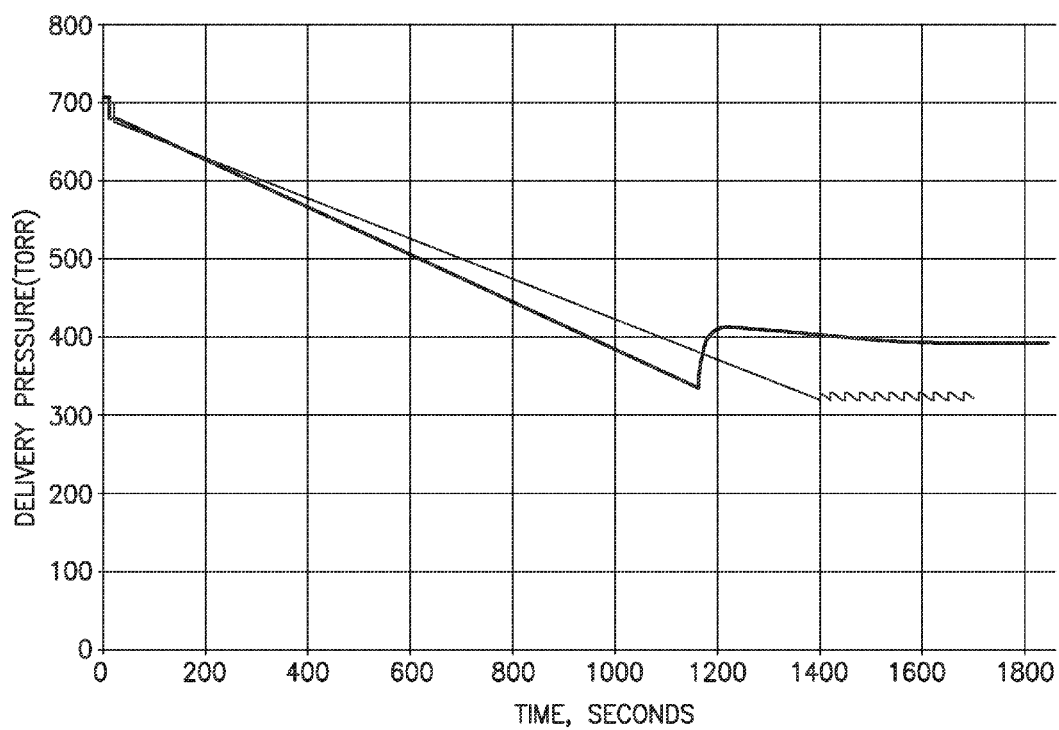
FIG. 14 is a graph of dispensed gas pressure as a function of time, before and after cycling of a regulator poppet in a system of the type shown in FIG. 13.

FIG. 14 is a graph of dispensed gas pressure as a function of time, before and after cycling of a regulator poppet in a system of the type shown in FIG. 13. Before cycling, the delivery pressure (upper line from 200 to 1175 seconds) after initiation of dispensing displays significant oscillation. After cycling, the delivery pressure (upper line after 1175 seconds) is consistent and non-oscillatory in character.

It will therefore be appreciated that there are a wide variety of assemblies, approaches and mechanisms that may be advantageously employed within the broad practice of the present disclosure, to at least partially attenuate pressure-spiking behavior incident to inception of fluid dispensing in pressure-regulated fluid storage and dispensing vessels of corresponding fluid supply packages.

While the disclosure has been set out herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. A fluid supply package comprising a pressure-regulated fluid storage and dispensing vessel, said dispensing vessel comprising two pressure regulators in series in an interior volume thereof, a first pressure regulator has a higher set point pressure and a second pressure regulator downstream of said first pressure regulator and upstream of a discharge port of a valve head has a lower set point pressure than the first pressure regulator, wherein the first pressure regulator set point pressure is at least twice the lower set point pressure and is between 100 psig to 1500 psig, the valve head adapted for dispensing of fluid from the dispensing vessel, said valve head comprising the discharge port, and a flow control valve that is operable to control fluid dispensing, and a fluid flow restrictor in a fluid discharge passage of the discharge port.

2. The fluid supply package of claim 1, wherein the pressure regulator upstream of the discharge port has a subatmospheric pressure set point.

3. The fluid supply package of claim 1, wherein the setpoint pressure of the second, downstream pressure regulator is between 100 torr and 100 psig.

4. The fluid supply package of claim 1, further comprising a flow path reducer connecting said first pressure regulator and said second pressure regulator downstream of said first pressure regulator and upstream of the discharge port of the valve head.

5. The fluid supply package of claim 1, wherein a gas discharge line is coupled to the discharge port of said valve head and a cycling valve is coupled to said gas discharge line that is selectively cycleable to establish fluid flow communication between the gas discharge line and one of a first branch line and a second branch line, said first branch line has a first flow isolation valve therein and is coupled with a pump arranged to exert suction on gas discharge line and to discharge gas in exhaust line; said second branch line contains pressurizing pump therein and is joined to pressurizing gas source, with second flow isolation valve in such line serving to control flow of pressurized gas to the pressurizing pump.

6. The fluid supply package of claim 1, wherein the pressure-regulated fluid storage and dispensing vessel contains a fluid.

7. The fluid supply package of claim 6, wherein said fluid comprises a fluid for semiconductor manufacturing, manufacturing of flat-panel displays, or manufacture of solar panels.

8. The fluid supply package of claim 6, wherein said fluid comprises a dopant source fluid.

9. A fluid supply package comprising a pressure-regulated vessel including a pressure regulator therein upstream of a discharge port of a valve head of the vessel, a pressurization/depressurization assembly comprising a gas discharge line that is coupled to the discharge port of a valve head, said valve head and a cycling valve coupled to said gas discharge line that is selectively cycleable to establish fluid flow communication between the gas discharge line and one of a first branch line and a second branch line, said first branch line has a first flow isolation valve therein and is coupled with a pump arranged to exert suction on gas discharge line and to discharge gas in exhaust line; said second branch line contains pressurizing pump therein and is joined to pressurizing gas source, with a second isolation valve in such line serving to control flow of pressurized gas to the pressurizing pump, said pressure regulator comprising a flow control element that is openable and closable in response to pressure at the discharge port, said pressurization/depressurization assembly arranged to repetitively and alternatingly apply pressure and reduce pressure at the discharge port so that the flow control element of the pressure regulator assembly is cyclically opened and closed for a predetermined time period to stabilize pressure and suppress pressure oscillations in subsequent dispensing operation of the fluid supply package.

10. The fluid supply package of claim 9, wherein the pressure-regulated vessel comprises a series arrangement of pressure regulators in the interior volume of the vessel.

11. The fluid supply package of claim 9, wherein the pressure regulator has a subatmospheric pressure set point.

12. A method of suppressing pressure oscillations in gas dispensed from a pressure-regulated vessel that comprises a first pressure regulator in the vessel, said method comprising repetitively and alternatingly applying pressure and reducing pressure at a discharge port of a valve head of the pressure-regulated vessel, said discharge port connected to a gas discharge line, the pressure in the gas discharge line experienced by the discharge port cycles between pressure above a set point of the first pressure regulator and pressure condition below the set point of the first pressure regulator, so that a poppet of the first pressure regulator opens and closes; cycling the poppet opened and closed for a predetermined time period to stabilize pressure and suppress pressure oscillations in subsequent dispensing operation from the pressure-regulated vessel said stabilized pressure characterized by a graph of dispensed gas pressure from said pressure-regulated vessel as a function of time that is consistent and non-oscillatory in character.

13. The method of claim 12, wherein the pressure-regulated vessel comprises a series arrangement of pressure regulators in the interior volume of the vessel, said series arrangement comprises the first pressure regulator that has a higher set point pressure and a second pressure regulator downstream of said first pressure regulator and upstream of the discharge port of the valve head that has a lower set point pressure than the first pressure regulator and wherein the first pressure regulator set point pressure is at least twice the lower set point pressure and is between 100 psig to 1500 psig.

14. The method of claim 13, wherein the second pressure regulator has a subatmospheric pressure set point.

15. The method of claim 12, wherein the pressure-regulated vessel comprises two pressure regulators in series in an interior volume thereof, the first pressure regulator has a higher set point pressure and a second pressure regulator downstream of said first pressure regulator and upstream of the discharge port of the valve head has a lower set point pressure than the first pressure regulator, wherein the first pressure regulator set point pressure is at least twice the lower set point pressure and is between 100 psig to 1500 psig, the valve head adapted for dispensing of fluid from the vessel, said valve head comprising the discharge port and a flow control valve that is operable to control fluid dispensing and a fluid flow restrictor in a fluid discharge passage of the discharge port.

16. The method of claim 12, wherein the pressure-regulated vessel comprises a cycling valve coupled to said gas discharge line that is selectively cycleable to establish fluid flow communication between the gas discharge line and one of a first branch line and a second branch line, said first branch line has a first flow isolation valve therein and is coupled with a pump arranged to exert suction on gas discharge line and to discharge gas in exhaust line; said second branch line contains pressurizing pump therein and is joined to pressurizing gas source, with a second isolation valve in such line serving to control flow of pressurized gas to the pressurizing pump, said first pressure regulator comprising a flow control element that is openable and closable in response to pressure at the discharge port, a pressurization/depressurization assembly arranged to repetitively and alternatingly apply pressure and reduce pressure at the discharge port so that the flow control element of the first pressure regulator is cyclically opened and closed for a predetermined time period to stabilize pressure and suppress pressure oscillations in subsequent dispensing operation of the pressure-regulated vessel.

* * * * *